(12) United States Patent
Allen et al.

(10) Patent No.: US 8,694,431 B1
(45) Date of Patent: Apr. 8, 2014

(54) DYNAMIC BIN ALLOCATION FOR PAYMENT CARD TRANSACTIONS

(71) Applicant: StoneEagle Services, Inc., Richardson, TX (US)

(72) Inventors: Robert M. Allen, Richardson, TX (US); Richard Alan Maxwell, Plano, TX (US)

(73) Assignee: StoneEagle Services, Inc., Richardson, TX (US)

( * ) Notice: Subject to any disclaimer, the term of this patent is extended or adjusted under 35 U.S.C. 154(b) by 0 days.

(21) Appl. No.: 14/028,040

(22) Filed: Sep. 16, 2013

Related U.S. Application Data (60) Provisional application No. 61/704,765, filed on Sep. 24, 2012.

(51) Int. Cl.
G06Q 40/00 (2012.01)
(52) U.S. Cl.
USPC .......................................................... 705/41
(58) Field of Classification Search
USPC ..................................... 705/35–41
See application file for complete search history.

(56) References Cited

U.S. PATENT DOCUMENTS

| | | | |
|---|---|---|---|
| 2006/0020542 A1* | 1/2006 | Litle et al. | 705/40 |
| 2010/0088204 A1* | 4/2010 | Nambiar et al. | 705/30 |
| 2011/0106609 A1* | 5/2011 | Fernandez | 705/14.38 |
| 2012/0254034 A1* | 10/2012 | Statland et al. | 705/44 |

* cited by examiner

*Primary Examiner* — Olabode Akintola
(74) *Attorney, Agent, or Firm* — Anton J. Hopen; Smith & Hopen, P.A.

(57) ABSTRACT

Preauthorized payments may be made to service providers, repair shops and even vendors serving employees on business trips through credit card processing. The approved payment amount is authorized on a virtually created payment card which is then sent to the payee. These transactions incur interchange fees for the card processing. Therefore, unlike a check or EFT payment, the payee receives the approved payment less interchange fees. Interchange rates vary based on the payment card product offered by an issuing bank in addition to factors relating to how the payment card is processed. The current invention is a method of automatically generating a virtual payment card and/or processing the card in a manner to achieve a target interchange fee.

14 Claims, 10 Drawing Sheets

Fig. 1

*(prior art)*

Fig. 2

*(prior art)*

DYNAMIC BIN ALLOCATION FOR PAYMENT CARD TRANSACTIONS

CROSS-REFERENCE TO RELATED APPLICATIONS

This nonprovisional application is a continuation of and claims priority to provisional application No. 61/704,765 entitled "Payment System and Method," filed Sep. 24, 2012 by the same inventor.

BACKGROUND OF THE INVENTION

1. Field of the Invention

This invention relates to facilitating payments by a third party. More specifically, it relates to automatically adjusting the effective interchange rate incurred for pre-approved or pre-authorized card payments to payees.

2. Brief Description of the Related Art

Interchange is a fee paid between banks for the acceptance of card-based transactions (such as VISA and MASTERCARD charges). Usually it is a fee that a merchant's bank (the "acquiring bank") pays a customer's bank (the "issuing bank") however there are instances where the interchange fee is paid from the issuer to acquirer. This is sometimes called reverse interchange.

In a credit card or debit card transaction, the card-issuing bank in a payment transaction deducts the interchange fee from the amount it pays the acquiring bank that handles a credit or debit card transaction for a merchant. The acquiring bank then pays the merchant the amount of the transaction minus both the interchange fee and an additional, usually smaller fee for the acquiring bank or ISO, which is often referred to as a discount rate, an add-on rate, or "passthru."

Interchange fees are set by the credit card networks, and are the largest component of the various fees that most merchants pay for the privilege of accepting credit cards, representing 70% to 90% of these fees. Interchange fees have a complex pricing structure, which is based on the card brand, regions or locations, the type of credit or debit card, the type and size of the accepting merchant, and the type of transaction (e.g. online, in-store, telephone sale, whether the card is present for the transaction, etc.). Further complicating the rate schedules, interchange fees are often a flat fee plus a percentage of the total purchase price (including taxes). In the United States, the fee averages approximately 2% of transaction value and are set by the payment networks such as VISA and MASTERCARD.

Generally, the bulk of the interchange fee goes to the issuing bank. Issuing banks' interchange fees are extracted from the amount collected by the merchants when they submit credit or debit transactions for payment through their acquiring banks. Banks do not expect to make a significant amount of money from late fees and interest charges from creditworthy customers that pay their monthly bill in full. Rather, the banks make their profits on the interchange fee charged to merchants.

Interchange rates are set at differing percentages for a number of reasons. A premium credit card that offers rewards generally will have a higher interchange rate than do standard cards. Transactions made with credit cards generally have higher rates than those with signature debit cards, whose rates are often higher than PIN debit card transactions.

Card-not-present sales that are not conducted in person, such as by phone or on the Internet, generally are subject to higher interchange rates. Interchange is also set to encourage issuance and to attract issuing banks to issue a particular brand. Higher interchange is often a method to encourage issuance of their particular brand.

Interchange Example

Consider a consumer making a $100 purchase with a credit card. For that $100 item, the retailer would get approximately $98. The remaining $2, known as the merchant discount and fees, gets divided up. About $1.75 would go to the card issuing bank (defined as interchange), $0.18 would go to Visa or MasterCard association (defined as assessments), and the remaining $0.07 would go to the retailer's merchant account provider.

Card numbers are found on payment cards, such as credit cards and debit cards, as well as stored-value cards, gift cards and other similar cards. Some card issuers refers to the card number as the primary account number (PAN). They have a certain level of internal structure and share a common numbering scheme. Bank card numbers are allocated in accordance with ISO/IEC 7812. The bank card number merely identifies the card, which is then electronically associated by the issuing organization with one of its customers and then to the customer's designated bank account.

In the case of stored-value type cards, there is no necessary association with a particular customer. An ISO/IEC 7812 card number is typically 16 digits in length, and consists of: (a) a six-digit Issuer Identification Number (IIN) (also called the "Bank Identification Number" (BIN)) the first digit of which is the Major Industry Identifier (MII); (b) a variable length (up to 12 digits) individual account identifier; and (c) a single check digit calculated using the Luhn algorithm.

The first digit of a credit card number is the MIL which represents the category of entity which issued the card. For example, VISA, and MASTERCARD are in the banking and financial category and each use an Mil integer of 4 and 5 respectively.

Together, first six digits of a card number (including the initial MII digit) are known as the issuer identification number (IIN) or the BIN. These identify the institution that issued the card to the card holder. The IIN database and membership is managed by the American National Standards Institute (ANSI) and is updated monthly. ANSI is responsible for allocating IIN ranges to the issuing networks. Both VISA and MASTERCARD publish tables that set interchange reimbursement fees.

When payments are made through typical card transactions, the merchant is generally subject to the interchange rate of the card type accepted. Therefore, when a product or service is purchased by credit card, there is typically some uncertainty as to the exact amount the merchant will net because the interchange is variable.

An industry exists that pays a large number of benefit claims (e.g., warranty, medical, dental and the like) through virtual payment cards. This industry provides a faster means of payment to merchants with greater efficiency than traditional check payments. However, these virtual payments do incur interchange fee overhead. A long-felt need in the industry exists to dynamically generate virtual payment cards that meet predefined interchange fee targets. This need is met by the current invention.

BRIEF SUMMARY OF THE INVENTION

An embodiment of the invention includes the steps of receiving an authorized amount value from a third party administrator (TPA) to pay at least a portion of claim charges made by a service provider against a claims policy. For example, a doctor may charge $150 for an X-ray but the patient's insurance policy will only pay $100 for X-rays. The TPA would authorize payment of $100 for the claim and also generate a remittance advice (or explanation of benefits) indicating that $50 of the $150 charge was not covered under the policy.

A target interchange rate is then set. This may typically range from one to four percent of the transaction. Based on the target interchange rate, a BIN account from an issuer bank is automatically selected. The BIN account has an effective interchange rate based on the inclusion or exclusion of six interchange factors. These factors may include: (1) whether the card is not present (CNP); (2) whether enhanced data is included in the transaction; (3) whether a personal identification number (PIN) was included if the payment card was a debit card type; (4) whether address verification data (AVS) was included (e.g., billing zip code); (5) whether the settlement was batched timely or delayed; and (6) whether a security code was included (e.g., CVC or CVC2).

A virtual payment card is then generated with the selected BIN account wherein the effective BIN interchange rate is adjusted in accordance with the target interchange rate by the inclusion or exclusion of the interchange factors. The virtual payment card is then authorized to the TPA-approved amount value. Processing of the virtual payment card for the authorized amount on behalf of the service provider incurs the effective interchange rate.

For straight-through payment processing, when including or excluding the interchange factors noted above, the virtual payment card data is transmitted directly to the acquirer for the service provider and the remittance advice is separately sent to the service provider. Alternatively, the card data may be sent to the service provider concurrently with the remittance advice. This permits the service provider to refund back some or all of the straight-through payment if the circumstances of the transaction warrant.

In an embodiment of straight-through payment processing, a buyer initiates payment via a payment instruction file (PIF). The PIF is sent via a secure connection to the card network's gateway. A gateway translation engine reviews the PIF and ensures that all relevant data is present. The file is then forwarded to the appropriate financial institution for clearing and settlement.

However, in an alternative embodiment of the invention the remittance advice and the virtual payment card are sent to the service provider directly. In this case, a specific BIN product may be selected close to the target interchange rate without any variance on the interchange factors. Alternatively, certain factors such as including or excluding the PIN may help to fine-tune the effective interchange rate close to the target rate.

The target interchange rate may be based on the authorized amount value. For example, if the amount is greater than $1,000, a lower interchange rate is automatically selected. The interchange rate may also be associated with the amount on a dollar-to-basis point scale. The rate may also be set at tiers (e.g., rate A from $0 to $100, rate B from $100 to $500, etc. . . . ).

The target interchange rate may also be based on the payment history to the service provider. For example, to induce the service provider to accept virtual payment cards the initial interchange rate may be lowered after $10,000 of payments have been made to the service provider and again at the $100,000 threshold.

The target interchange rate may also be set by the service provider, third party administrator or even the carrier for the claims policy.

Hardware and Software Infrastructure Examples

The present invention may be embodied on various computing platforms that perform actions responsive to software-based instructions. It should be noted that the automation necessary to select an appropriate BIN account based on targeted interchange rates and generate a virtual card payment is not feasible without integrating into an automated computer system. The current invention anticipates this technological feature would be applied to hundreds of thousands of transactions every month in a routine application. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. This invention also anticipates the software implementing the BIN allocation is embedded into systems such as credit card terminals, point-of-sale devices, These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
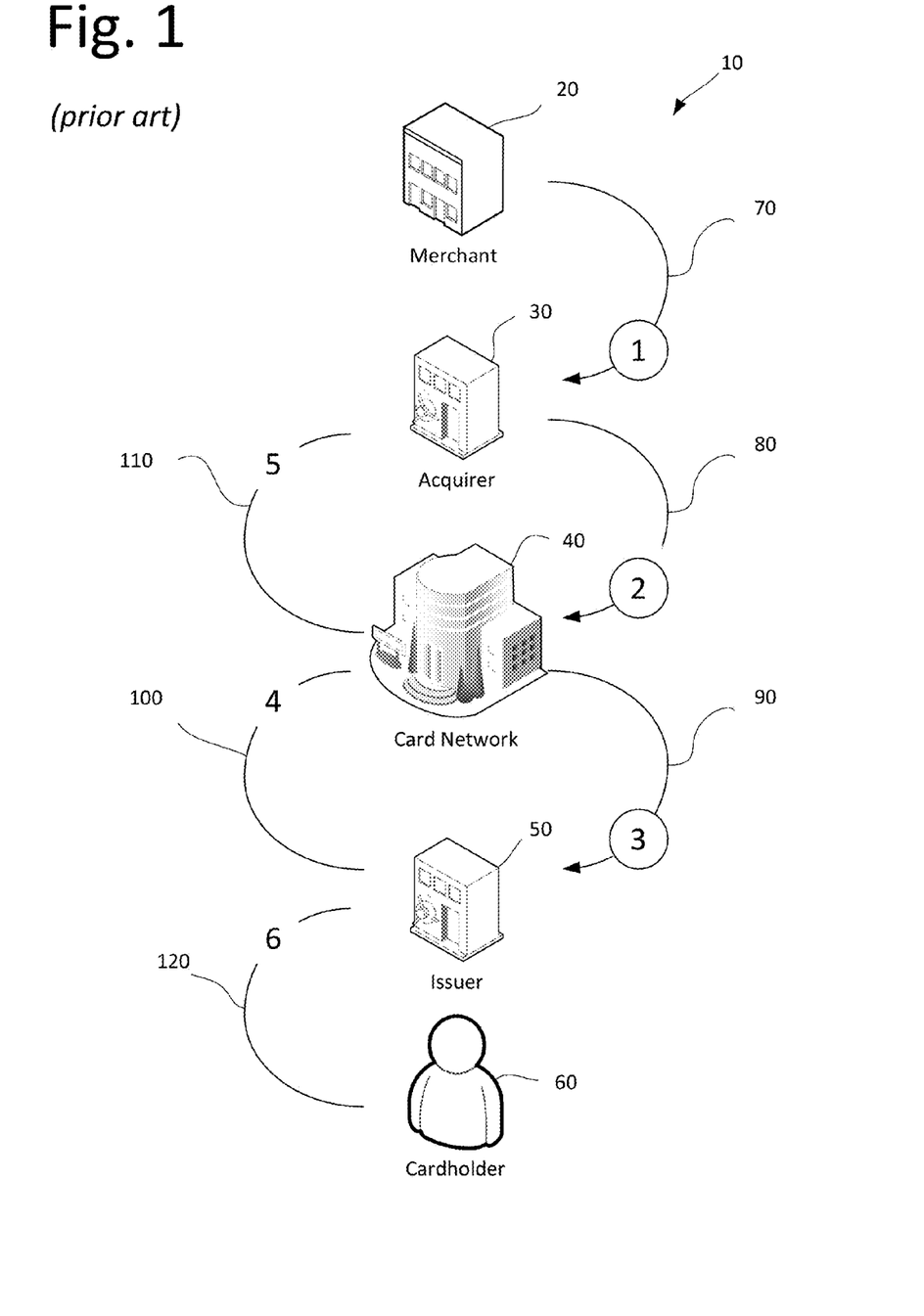
FIG. 1 is a diagrammatic view of a typical credit card transaction process.

A typical payment card transaction is denoted as a whole in FIG. 1 by the reference numeral 10. Cardholder 60 purchases goods or services from merchant 20. Merchant 20 effectively "sells" the transaction 70 to an acquirer bank 30 and is reimbursed the amount of the sales ticket less a discount fee. Acquirer 30 then submits 90 the transaction to the issuing bank 50 for payment through an interchange and settlement system 80 provided by card network 40. Issuing bank 50 pays 110 acquirer 30 through the card settlement system 100. Finally, cardholder 60 repays 120 issuing bank 50 for the goods or services originally purchased from merchant 20.

Figure 2:
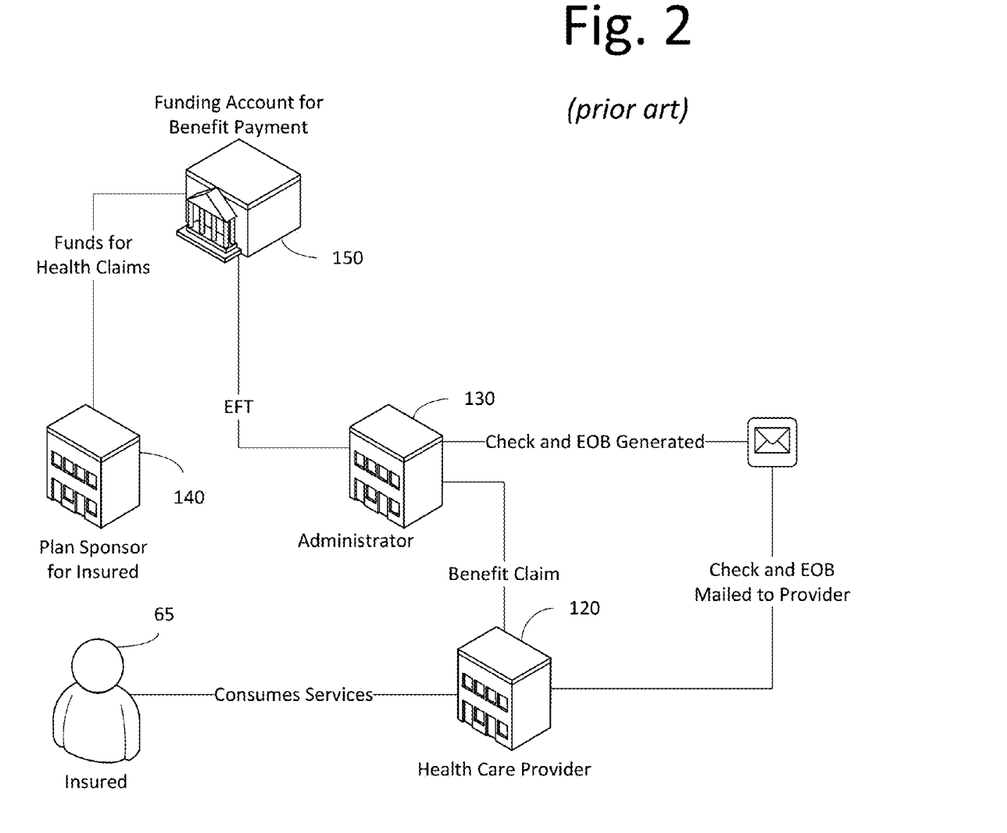
FIG. 2 is a diagrammatic view of a traditional payment of a benefit claim by check.

In FIG. 2, insured 65 consumes services of health care provider 120. Provider 120 submits a benefit claim to a third party administrator 130 against an insurance policy held by insured 65. Plan sponsor of the insured 140 funds account 150 which is used by administrator 130 to generate a check and an explanation of benefits (EOB). The check and email are mailed back to provider in payment of the services.

Figure 3:
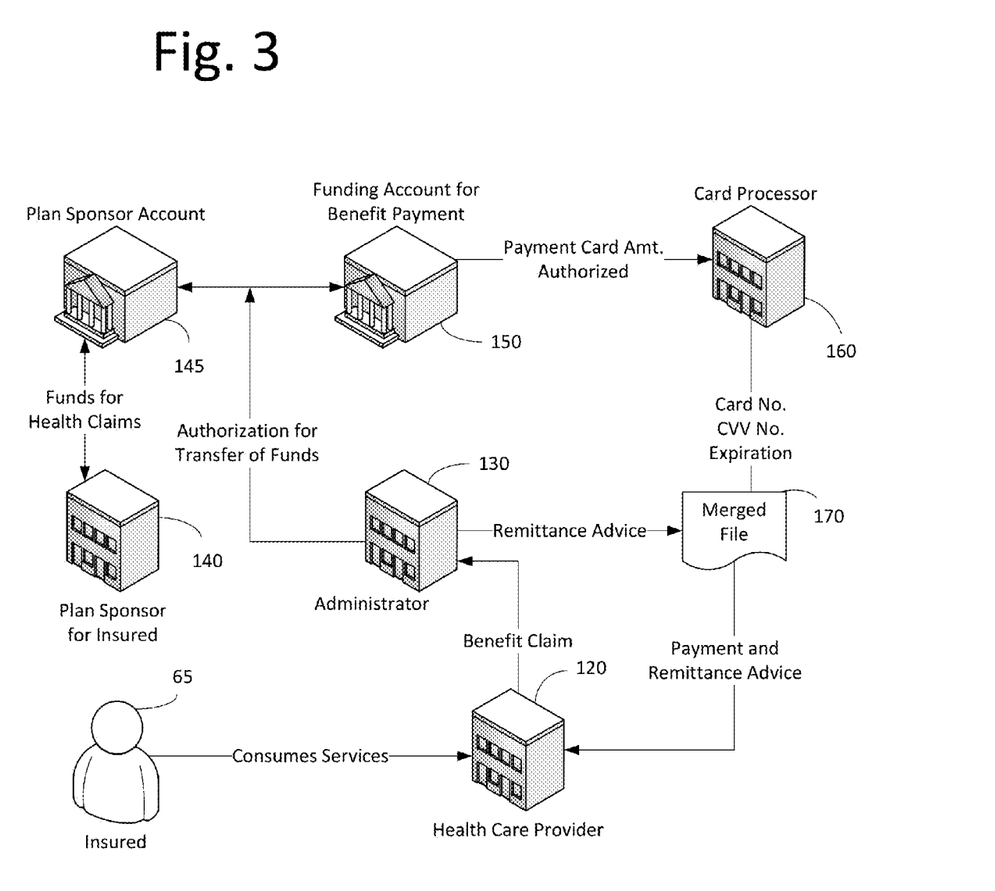
FIG. 3 is a diagrammatic view of payment of a benefit claim by a virtual payment card.

In FIG. 3, administrator 130 provides remittance advice which is merged 170 with virtual card account data generated by card processor 160 and sent to provider 120. The virtual card data typically includes the card number, CVV (security) code and an expiration date. This process is described in U.S. Pat. Nos. 7,792,686 and RE43904 and is incorporated herein by reference.

Figure 4:
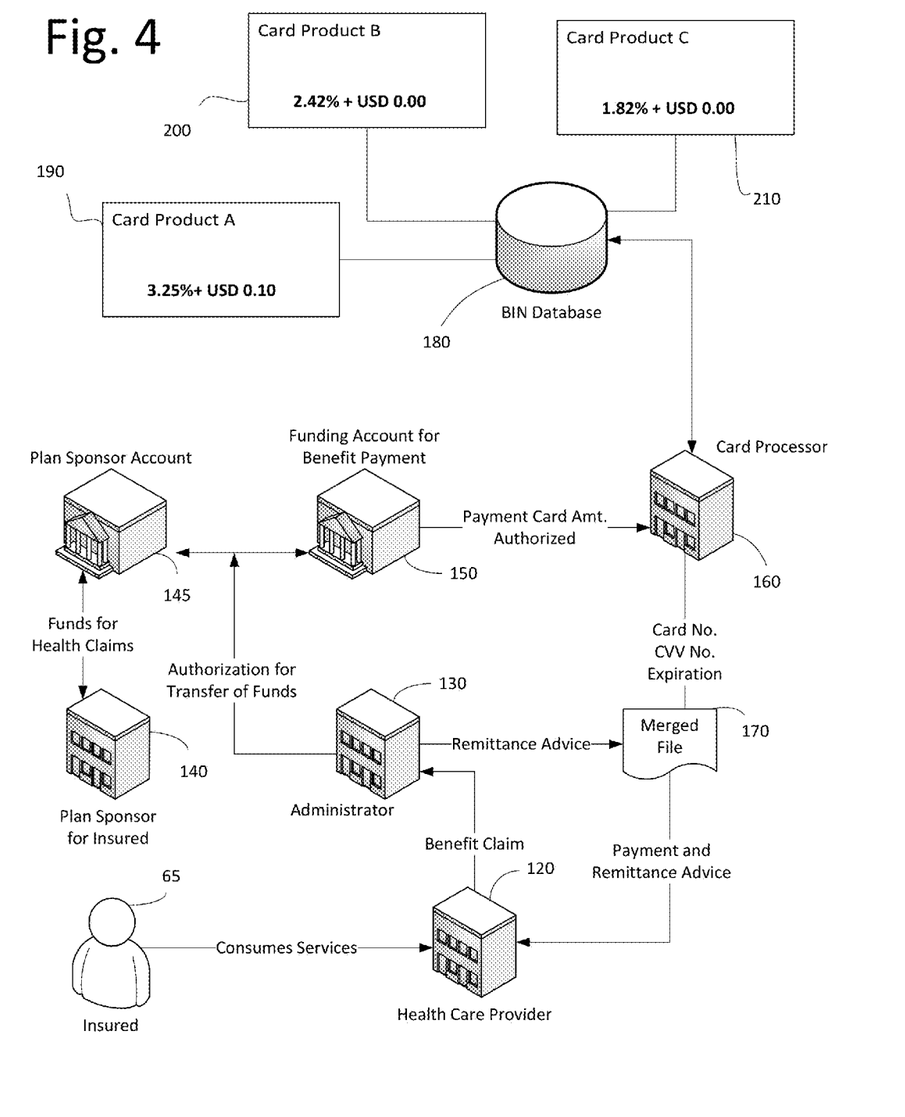
FIG. 4 is a diagrammatic view of an embodiment of the invention wherein a plurality of BINs are available to meet a target interchange rate. The virtual payment card is transmitted with remittance advice to a service provider.

In FIG. 4, card processor 160 does not arbitrarily select a BIN for the virtual card, but rather accesses BIN database 180. In the figure, three exemplary BIN products are provided: (1) product 190; (2) product 200; and (3) product 210. These products have interchange rates varying between 3.25%+$0.10 to 1.82%+$0.00. In this example, assume the target interchange rate for provider 120 is 250 basis points. Thus, product 200 would be selected as its 2.42% rate is the closest to 250 basis points. Card processor 160 uses product 200 from BIN database 180 and generates a virtual payment card which is merged 170 with remittance advice and sent to provider 120.

Figure 5:
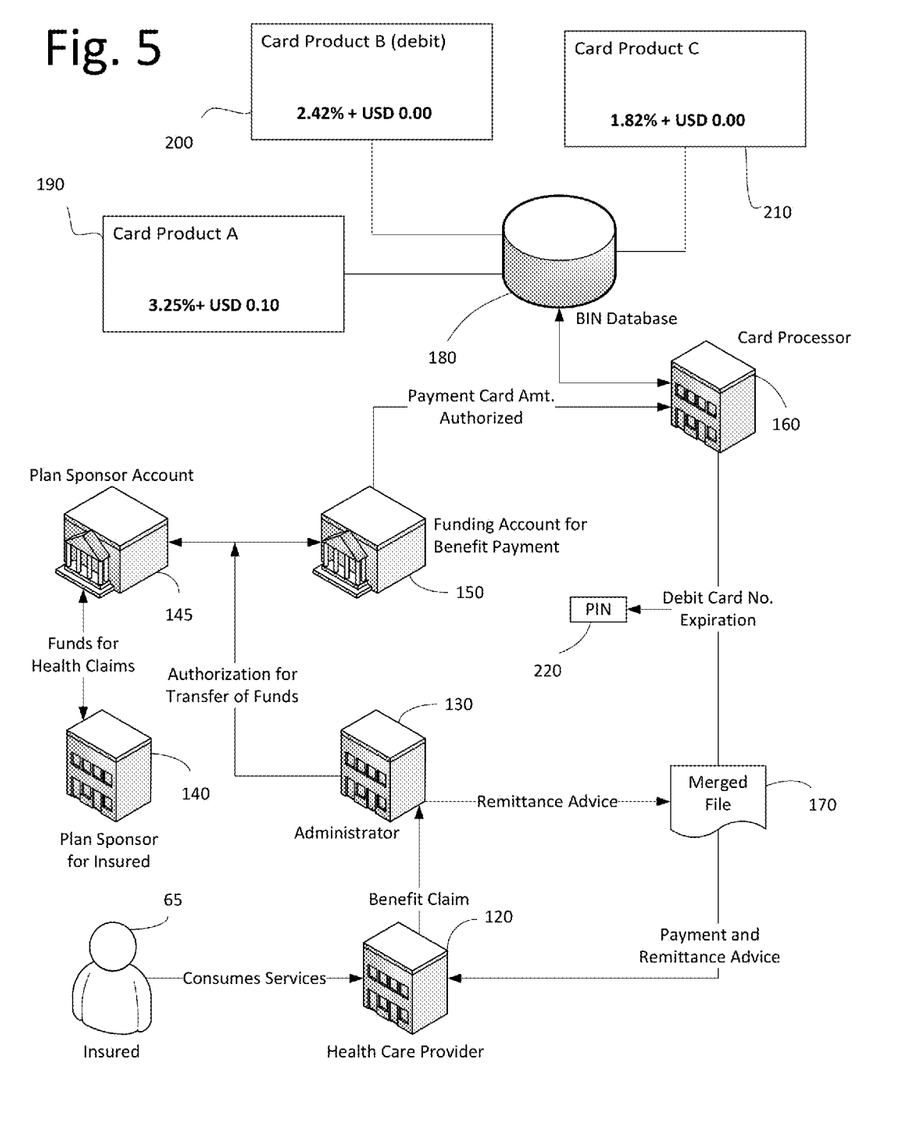
FIG. 5 is a diagrammatic view of an embodiment of the invention wherein the virtual payment card is a debit card type. It is transmitted with remittance advice to a service provider absent a PIN code.

In FIG. 5, an alternative embodiment of the invention is shown that permits the interchange rate to be more finely tuned. Assume the target interchange rate is now 284 basis points. This is between products 190 and 200 in BIN database 180. In this case, card processor 160 selects the lower interchange product 200 which is 242 basis points. However, card processor 160 excludes an interchange factor 220 from its virtual card payment to provider 120. This results in an interchange "downgrade" which increases the effective interchange rate to 280 basis points thereby more closely meeting the target interchange rate.

Figure 6:
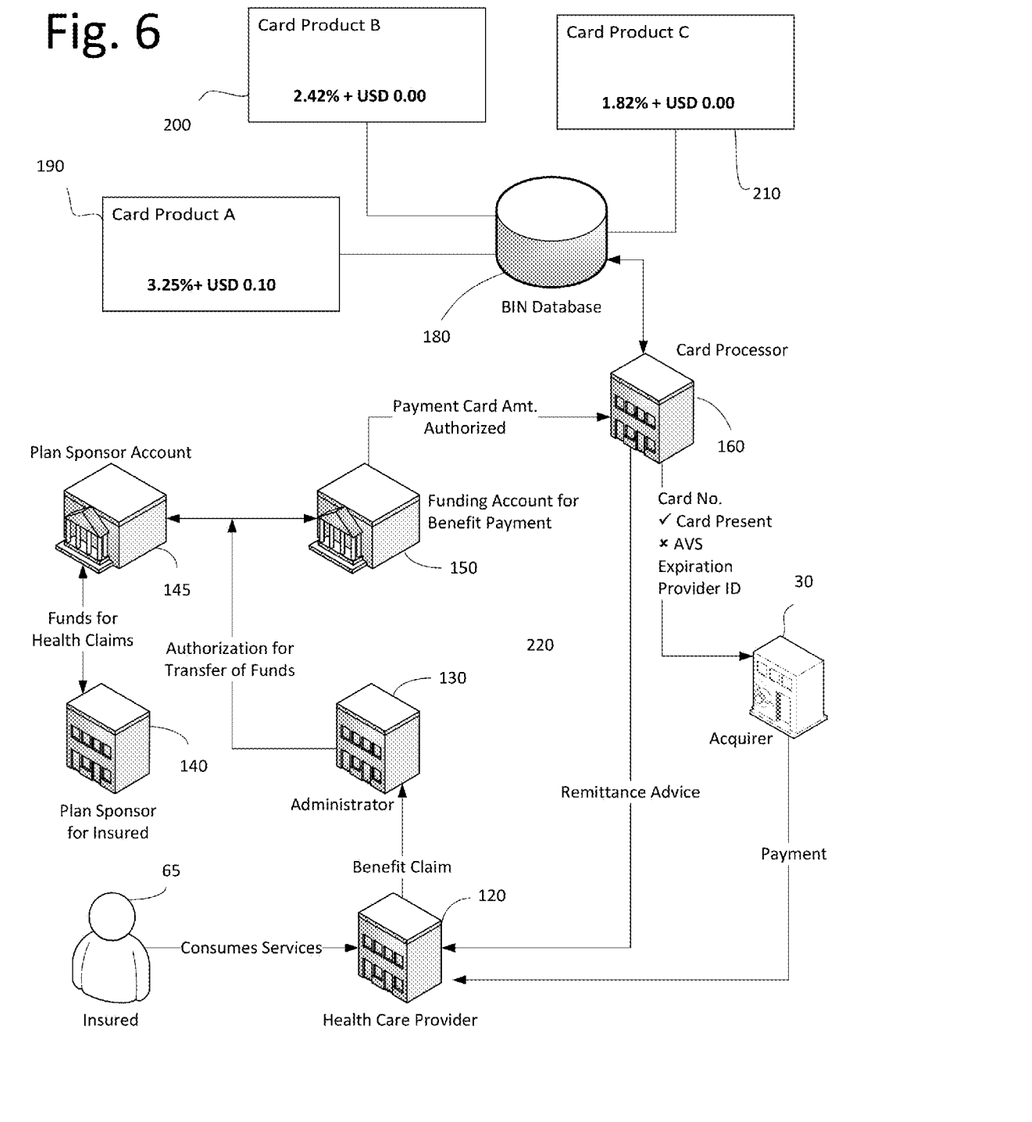
FIG. 6 is a diagrammatic view of an embodiment of the invention wherein the acquirer for the service provider is paid directly but without address verification services (AVS) data included.

An alternative embodiment of the invention shown in FIG. 6 utilizes push-through payments which are made from the card processor 160 directly to the card acquirer 30 for provider 120. Push-through payments gives the card processor 160 greater control in which interchange factors are included or excluded. These types of payments are described in U.S. Pat. No. 8,249,893 which is incorporated herein by reference. Referencing FIG. 6, card processor 160 selects card product 190, 200 or 210 but desires to effect an interchange downgrade. Card processor 160 transmits virtual payment card data to acquirer 30 but leaves out address verification system (AVS) data. This increases the interchange rate to the target rate desired.

Figure 7:
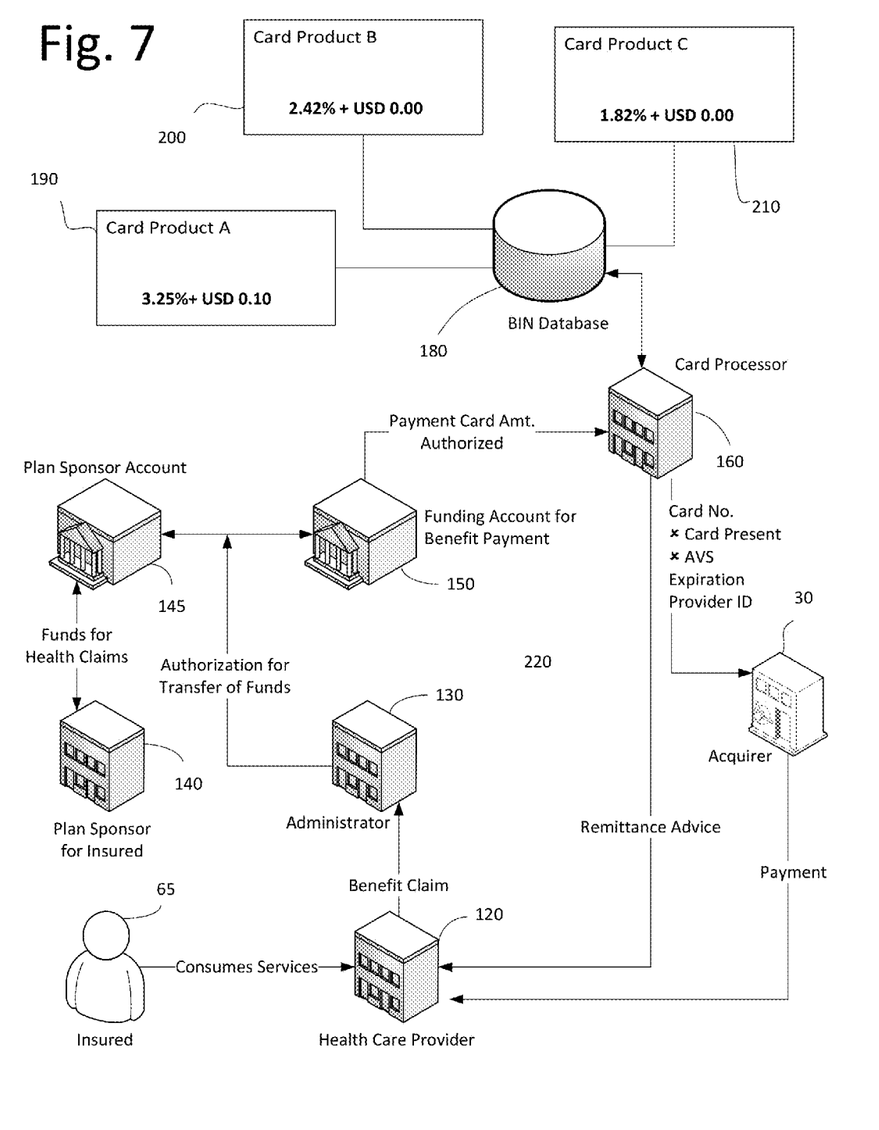
FIG. 7 is a diagrammatic view of an embodiment of the invention wherein the payment is presented to the acquirer as a card not present (CNP) straight through transaction and without AVS data.

What if the interchange rate needs to be increased even more? Card processor 160 in FIG. 7 send the virtual payment card data lacking AVS data as in FIG. 6 but now also sends the information as a card not present (CNP) transaction. This results in an additional interchange downgrade.

Figure 8:
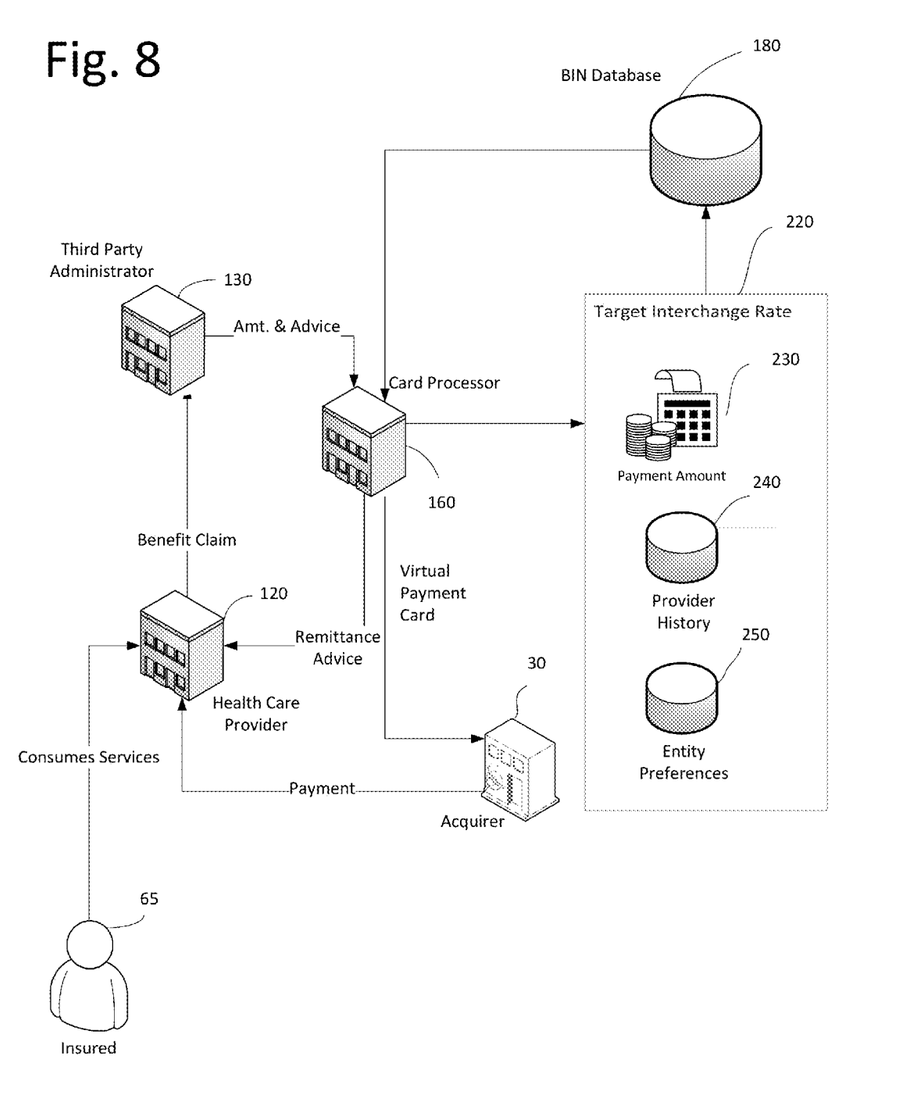
FIG. 8 is a diagrammatic view of an embodiment of the invention wherein the target interchange rate is set by one or more factors.

In FIG. 8 card processor 160 sets target interchange rate 220 by evaluating one or more factors including, but not limited to, the payment amount 230, provider history 240 and entity preferences 250. Entity preferences 250 include those of the health care provider 120, acquirer 30, card processor 160, third party administrator 130, and plan sponsor 140.

Figure 9:
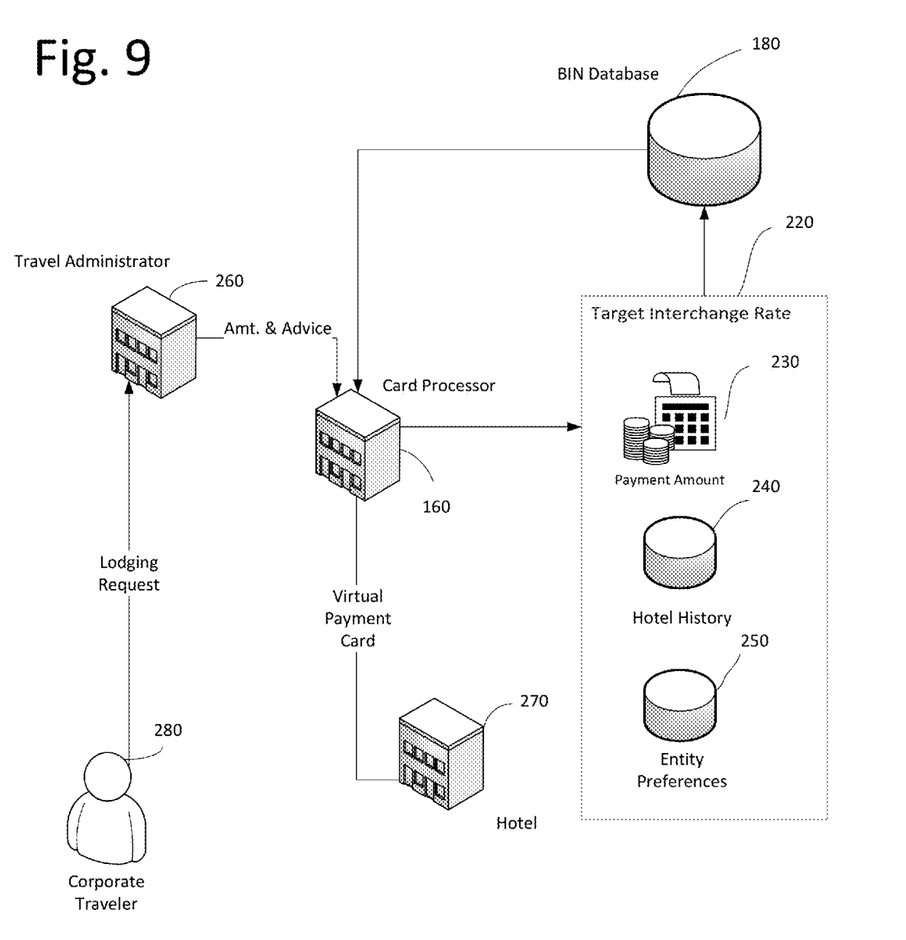
FIG. 9 is a diagrammatic view of an embodiment of the invention as applied to the travel industry.

In FIG. 9, corporate traveler 280 makes a lodging request to stay at hotel 270. Travel administrator 260 sends an approved amount and remittance advice to card processor 160. Target interchange rate 220 is obtained and the appropriate account from BIN database 180 is used to generate a virtual payment card to pay hotel 270 on behalf of corporate traveler.

Figure 10:
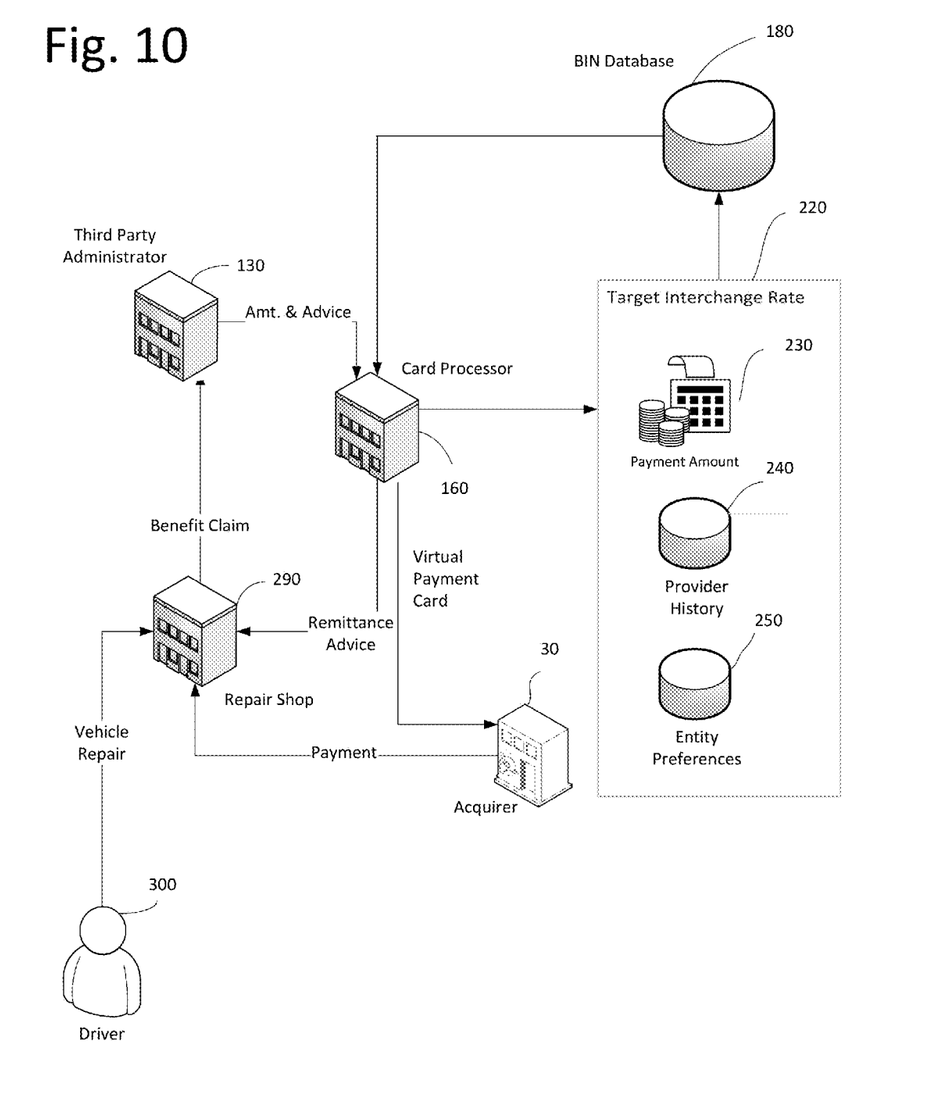
FIG. 10 is a diagrammatic view of an embodiment of the invention as applied to the vehicle repair industry.

In FIG. 10, driver 300 experiences a vehicle break-down and needs service at repair shop 290. The repair is covered under warranty so repair shop forwards the benefit claim under the vehicle warranty to third party administrator 130 who sets an authorized amount for the repair and returns remittance advice to card processor 160. Card processor automatically generates a virtual payment card from BIN database 180 and sends payment via a straight-through transaction to acquirer 30. Acquirer 30 settles the transactions and makes payment to repair shop 290. Card processor 160 informs repair shop 290 that payment has directly been made to acquirer 30 for the vehicle repair.

An advantage of the invention is that virtual card payment of claim benefits can be modified to accommodate target interchange rates. This helps the participants to the transaction to set interchange rates that cover the cost of processing but also balance the overhead in receiving card payments by the service provider. Target interchange rates may be adjusted based on the services, history, and payment amounts made to the service provider. Higher interchange rates may be used to amortize billing system upgrades, support and services without incurring upfront, out-of-pocket expenses to the service provider.

GLOSSARY OF TERMS

Acquirer: a bank or financial organization that processes credit and/or debit card payments for products or services for a merchant. Also called an acquiring bank, merchant bank or sponsor bank.

Authorization: is a process by which a transaction is approved by the issuer of by the card network on behalf of the issuer. Permission is given or denied via the acquirer to accept a specific transaction from the cardholder account. The authorization indicates the card is valid and that sufficient funds are available for payment of the requested amount.

Authorization Approval Code: is a numerical code assigned to a sales transaction indicating that the sale is authorized.

AVS: is address verification services. AVS uses the billing information associated with a card to verify the cardholder's address.

Bank Account Information: information used to identify a specific bank account. This information can include routing numbers, account data, account numbers and other information used to identify a bank account.

BIN: is a six-digit Bank Identification Number assigned to each federally insured financial institution for the routing of transactions and other purposes. It is also known as an Issuer Identification Number (TIN) the first digit of which is the Major Industry Identifier (MII).

Card Association: a collective network of both the card network and the banks that issue cards operable on the network's infrastructure.

Card Network: financial networks that administer the credit and debit card processing. These networks include those known by the brands VISA, MASTERCARD, AMERICAN EXPRESS, DISCOVER, DINER'S CLUB, and JCB.

Card Verification Code (CVV): is numeric security code that provides extra security against unauthorized use during non-face to face transactions. CVV codes are three-digit numbers on the back of VISA and MASTERCARD credit and debit cards. The CVV number helps guard against the use of data stolen from payment networks by hackers. Intercepted data will usually comprise the cardholder name, card number and card expiration date, but not the CVV, which is generally obtained only by viewing the physical card.

CNP Transaction: is a "card not present" transaction such as payments taken over the Internet or by phone or mail.

Computer Based Server: a computer hardware system dedicated to running one or more services. Services can vary from database server, file server, mail server, print server, web server, or various other types services achieved through a computer program.

Computing Device: a computer hardware system typically connected by a wide area or local area network to transmit data, receive data, and store (either ephemerally or permanently) said data in conjunction with its programming Computing device may also perform business logic, calculations, and present data by various media.

Delayed settlement: merchants have to settle transactions within a specific amount of time after authorization to avoid interchange downgrades (i.e., increases in interchange fees). The maximum period varies for everyone and is determined by industry, transaction type, channel used, and more.

Digital storage medium: is any data repository able to save non-transitory information. This is typically or more hard drives operable by a relational database.

EDI: Electronic Data Interchange.

EFT: Electronic Funds Transfer.

Electronic Remittance Advice (ERA): Any of several electronic formats for explaining the payments of health care claims.

Enhanced Data: Additional data submitted by a merchant through a credit card network that typically lowers the interchange rate incurred for the transaction. Enhance data includes sales tax breakdown, customer references, merchant order numbers, transportation information, hotel accommodation information, car rental data, product codes, item descriptions, item quantities, item units, discount amounts, shipping information and the like. This additional data is known as Level II and Level II data.

Explanation of benefits (EOB): is a statement typically sent by a health insurance entity explaining what medical services were covered under an insurance policy. An EOB will typically include a summary of the services performed, the medical provider's fee and the amount a patient is responsible for.

Fax: is short for facsimile. It is a method of sending image data across the standard phone line to another fax machine. It is considered by many service providers a relatively secure means of transmitting and receiving sensitive financial and medical information.

First Payment: is the initial transaction made by the card processor to the service provider using a virtual card payment which. The processing of that transactions enables the card processor to capture information necessary to make subsequent payments directly to the acquirer of the service provider thereby avoiding the need to generate virtual card payments and have those payments manually processed by the service provider.

FTP: (file transfer protocol) is an Internet protocol is used to copy files between computers—usually a client and an archive site. For the purposes of this application this includes encrypted variants such as Explicit FTPS, SSH File Transfer Protocol and tunneling a normal FTP session over an SSH connection.

Health Care Claim: refers to an electronic transition standard code 837 as defined by X12. Variants of the 837 code include 837i for institutional health care claims; 83'7p for professional health care claims; and 837d for dental health care claims.

Health Care Claim Payment (835): refers to an electronic transition standard code 835 as defined by X12 for a health care claim payment and remittance advice.

HTTP: (hypertext transfer protocol) is the protocol used to transmit and receive all data over the World Wide Web. HTTPS is a secure variant of HTTP.

IIN: a six-digit Issuer Identification Number (IIN) (also known as the "Bank Identification Number" (BIN)) the first digit of which is the Major Industry Identifier (MII).

Independent Sales Organization (ISO): A company or individual contracted with a payment card processor or acquirer to acquire new merchants. Many ISOs provide customer support, technical support and installation support to its customers on behalf of the acquirer.

Interchange Fee: the fee paid between banks for the acceptance of credit and/or debit card based transactions. The interchange rate may be greater for certain transactions including, but not limited, those wherein the physical card is not present at the point-of-sale card terminal.

Issuing Bank: the bank that issues a credit, debit or stored value card to a consumer. This may be synonymous with the card processor in the context of the current claims. This is typically the cardholder's financial institution but in the case of a payment processor, the issued cards may be that of the processor.

Message: generally means an object of communication or vessel which provides information.

Payee: is the recipient of the payment card funds. In health care, this may be the service provider (e.g., physician's office) . For automobile warranties, this may be the mechanic or service department. For travel, the payee may be a hotel, airline or the traveler whose itinerary is often managed on his or her behalf.

Payor: In health care, an entity that assumes the risk of paying for medical treatments. This can be an uninsured patient, a self-insured employer, or a health care plan or HMO. Payor may also be used in other industries such as automobile warranty claims and travel services (such as paying for an employee's hotel room or airline ticket).

Payment Card: refers to any credit card, debit card, stored value card or the like.

Payment Receipt: refers to a transmission made by fax, email, or the like confirming that a direct payment has been made from the card processor to the acquirer for the service provider's merchant account. The payment receipt may be a merger of an authorization code, amount paid, date of payment, payer identity and an explanation of benefits into a single file or document.

Personal Information: information that can be used to uniquely identify, contact, or locate a single person or can be used with other sources to uniquely identify a single individual.

Personal Identification Number (PIN): A number used by a cardholder to authorize card payments. A PIN debit is a debit card transaction authorized by the cardholder using a personal identification number.

PCI DSS: is an acronym for the payment card industry data security standard. PCI DSS is a security standard for organizations that handle cardholder information.

Second Payment: is made by the card processor directly to the acquirer of the service provider's merchant account. This avoids the need to have the service provider manually process a virtual card payment.

Service Provider: refers to the entity that provides services to be paid for. Service providers applicable to the current invention may include, but are not limited to, construction contractors, vehicle repair shops, pharmacies and medical service providers.

SMS: (short message service) is a wireless technology for sending short text messages between mobile phones, fax machines, and IP addresses. It's similar to paging, except that the recipient's phone doesn't need to be active; instead, the message is stored.

SMTP: Simple Mail Transfer Protocol is used to send email. The SMTP protocol provides a common language for different servers to send and receive email messages. The default TCP/IP port for the SMTP protocol is port 25.

Standard Industrial Classification (SIC) code: is a United States government system for classifying industries by a four-digit code. This is also known as a Merchant Category Code (MCC).

Storage Device: is an electronic storage medium such as a hard drive, hard drive array, solid state memory, magnetic tape, and optical drives.

Stored Value Card: are those payment cards (in tangible or virtual form) which have a monetary value stored on them. Whereas the prepaid credit card can only be used with authorization from the cardholder, the stored value cards have an anonymous aspect. Examples of stored-value cards include the well-known telephone cards, merchant gift cards, or prepaid debit cards.

Virtual Payment Card: are payment cards that are generated electronically and not reduced to a physical plastic card. Virtual payment cards may be processed by a service provider as a CNP transaction or the data may be transmitted directly to the card acquirer for the service provider which in such case the CNP designation may or may not be included.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A computer implemented method for virtual card payment, the method comprising:
   electronically receiving on a computing device an authorized amount value from a payor to pay a designated payee;
   retrieving from an electronic storage device a target interchange rate for payment to the designated payee;
   automatically selecting a bank identification number account from an issuer bank, the bank identification number account having an effective interchange rate based on the inclusion or exclusion of interchange factors selected from the group consisting of card not present, enhanced data, debit personal identification number, address verification service, security code and delayed settlement;
   electronically generating a virtual payment card with the selected bank identification number account wherein the effective bank identification number interchange rate adjusted in accordance with the target interchange rate by the inclusion or exclusion of the interchange factors; and
   authorizing the virtual payment card to the authorized amount value whereby processing of the virtual payment card for the authorized amount on behalf of the designated payee incurs the effective interchange rate.

2. The method of claim 1 wherein the virtual payment card is electronically transmitted directly to a card acquirer for the designated payee for processing.

3. The method of claim 2 further comprising the steps of:
- receiving remittance advice related to the claim charges incurred by the designated payee, the remittance advice indicating which activities are payable under a claims policy; and
- transmitting the remittance advice to the designated payee with a confirmation that payment has already been made on its behalf directly to the card acquirer.

4. The method of claim 1 wherein the target interchange rate is based on the authorized amount value.

5. The method of claim 1 wherein the target interchange rate is based on the payment history to the designated payee.

6. The method of claim 1 wherein the target interchange rate is based on the preference of an entity selected from the group consisting of a third party administrator, a carrier for the claims policy, and the designated payee.

7. A computer implemented method for virtual card payment, the method comprising:
- electronically receiving on a computing device an authorized amount value from a payor to pay a designated payee;
- retrieving from an electronic storage device a target interchange rate for payment to the designated payee;
- accessing a plurality of bank identification number accounts at one or more issuer banks, each account having a predefined interchange rate;
- automatically selecting a single bank identification number account from the plurality of bank identification number accounts, the single bank identification number account's interchange rate in accordance to the target interchange rate;
- generating a virtual payment card with the selected, single bank identification number account and authorizing it to the authorized amount value; and
- sending the virtual payment card to the designated payee in payment of the authorized amount.

8. The method of claim 7 wherein the target interchange rate is based on the authorized amount value.

9. The method of claim 7 wherein the target interchange rate is based on the payment history to the designated payee.

10. The method of claim 7 wherein the target interchange rate is based on the preference of an entity selected from the group consisting of a third party administrator, a carrier for the claims policy, and the designated payee.

11. A computer implemented method for virtual card payment, the method comprising:
- electronically receiving on a computing device remittance advice related to charges incurred by a designated payee, the remittance advice generated by a third party administrator that determines which activities are payable under an claims policy;
- retrieving from an electronic storage device an authorized amount value from the third party administrator to pay at least a portion of the charges associated with the remittance advice;
- setting a target interchange rate for the payment to the designated payee;
- automatically selecting a bank identification number account from an issuer bank, the bank identification number account having an effective interchange rate based on the inclusion or exclusion of interchange factors selected from the group consisting of card not present, enhanced data, debit personal identification number, address verification service, security code and delayed settlement;
- electronically generating a virtual payment card with the selected, single bank identification number account wherein the effective bank identification number interchange rate is set closest to the target interchange rate by the inclusion or exclusion of the interchange factors; and
- authorizing the virtual payment card to the authorized amount value whereby processing of the virtual payment card for the authorized amount on behalf of the designated payee incurs the effective interchange rate; and
- electronically transmitting the virtual payment card data to a card acquirer for processing the authorized amount.

12. The method of claim 11 wherein the target interchange rate is based on the authorized amount value.

13. The method of claim 11 wherein the target interchange rate is based on the payment history to the designated payee.

14. The method of claim 11 wherein the target interchange rate is based on the preference of an entity selected from the group consisting of a third party administrator, a carrier for the claims policy, and the designated payee.

* * * * *